United States Patent
Dziesietnik et al.

(10) Patent No.: US 6,256,108 B1
(45) Date of Patent: Jul. 3, 2001

(54) METHOD AND APPARATUS FOR LABEL COMPOSITION

(75) Inventors: Ghilad Dziesietnik; Luis Trabb Pardo, both of Palo Alto, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 09/151,375

(22) Filed: Sep. 10, 1998

(51) Int. Cl.[7] .............................. B41B 15/00; B41J 15/00
(52) U.S. Cl. ...................... 358/1.18; 358/1.16; 358/1.17; 358/1.19; 382/180; 382/234; 382/444; 382/280
(58) Field of Search ................................ 358/1.1, 1.16, 358/1.17, 1.18, 1.9, 1.13, 1.15, 1.12; 382/180, 234, 244, 280, 444

(56) References Cited

U.S. PATENT DOCUMENTS

| | | | |
|---|---|---|---|
| 5,594,860 | * | 1/1997 | Gauthier .............................. 358/1.16 |
| 5,729,665 | * | 3/1998 | Gauthier .............................. 358/1.18 |
| 6,049,390 | * | 11/1997 | Northredame et al. ............. 358/1.15 |

FOREIGN PATENT DOCUMENTS

| | | | |
|---|---|---|---|
| 703 550A2 | 3/1996 | (EP) | .............................. G06T/11/60 |
| WO 96/35181 | 11/1996 | (WO) | .............................. G06F/17/21 |
| WO 98/13788 | 4/1998 | (WO) | .............................. G06T/11/60 |

* cited by examiner

*Primary Examiner*—Edward Coles
*Assistant Examiner*—Twyler Lamb
(74) *Attorney, Agent, or Firm*—Michael A. Glenn (57) ABSTRACT

In variable data printing, a Variable data Job (varJob) is made out of variable data pages (varPages) which are composed by merging pregenerated labels (e.g. color separated compressed rectangular swatches). Labels are applied on any position in the page. All necessary clipping is preferably performed before labels are submitted to the VarJob. Labels are preprocessed as soon as they become available. Presumably many labels are generated once and applied many times, albeit at different positions in the page. A label preprocessor processes labels after their submission to the job by cutting them into swaths and creating auxiliary information for further planning and scheduling purposes. A page planner analyzes the page composition, estimates times and bandwidth requirements, and prepares a page composition descriptor (PCDesc) that specifies the way the page is composed. A page composer takes in a PCDesc and the necessary preprocessed labels and composes the page. The resulting page is again color separated and encoded.

21 Claims, 9 Drawing Sheets

| 80 | 81 | 82 |
|---|---|---|
| JPEG C Region | 0 | Strip Preallocation |
| JPEG M Region | 16K | Strip Preallocation |
| JPEG Y Region | 32K | Strip Preallocation |
| JPEG K Region | 48K | Strip Preallocation |
| SDSO Region | 64K | Rolling Window |
| Pixel Map Region | 96K | Rolling Window |
| JPEG Map Region | 120K | Rolling Window |
| Command Region | 124K | Rolling Window |

*FIG. 15*

METHOD AND APPARATUS FOR LABEL COMPOSITION

BACKGROUND OF THE INVENTION

1. Technical Field

The invention relates to printing data that are stored in an electronic format. More particularly, the invention relates to a method and apparatus for printing variable data.

2. Description of the Prior Art

A personalized print job is a description of a document composed of a number of copies, where each copy can be uniquely customized for the intended recipient. The pages are composed of text, graphics, and images which can be unique to just that copy, identical on every copy, or used on some copies of the document but not on others. For example, in a customized product brochure, unique elements can include the recipient's name and address, while the product company name and logo are identical on every copy, and the picture of the specific product that the recipient is interested in is found on some copies of the document, but not on others.

A personalization system includes every component that is required to build and print a personalized job. The front end of the system is the job creation process, which is generally driven by a database and authoring applications which build the description of a personalized job. The system also includes a raster image processor (RIP) and a printing system on the back end, which is optimized for the characteristics of the job, i.e. to print the job as fast as is possible.

The RIPing system needs to be able to deliver pages at least as fast as the rated engine speed of the output device. To this end, it must be possible to design a document that is largely made up of reusable page elements. Page elements can be text, graphics, images, or a combination thereof. Each personalized copy of a job can contain some unique information and some subset of these reusable page elements arranged by the document designer. Some of these elements are only used once, some are used on every copy of the document, and some are used only on select copies.

In a personalized job, page elements need only be RIPed once, then combined at the print engine. By only RIPing each element one time, unique documents can be delivered on-the-fly as quickly as possible.

Until now, personalized printing has been limited primarily to mass mailings such as utility and credit card bills, and specialized direct mail pieces. Applications are highly specialized for these specific uses and are costly to implement. Typically such applications have a high development cost, but generate very large volumes resulting in a low per-copy cost that tends to justify the initial high development cost.

For example, target marketing is generally considered to be less expensive and more effective than mass campaigns. Using demographic information to customize messages to the target audience produces significantly higher response rates. As time goes on, more and more information is collected from customer transactions. Companies use this information to customize their messages to their audience. They are then able to minimize their costs while realizing a greater return on investment.

Figure 1:
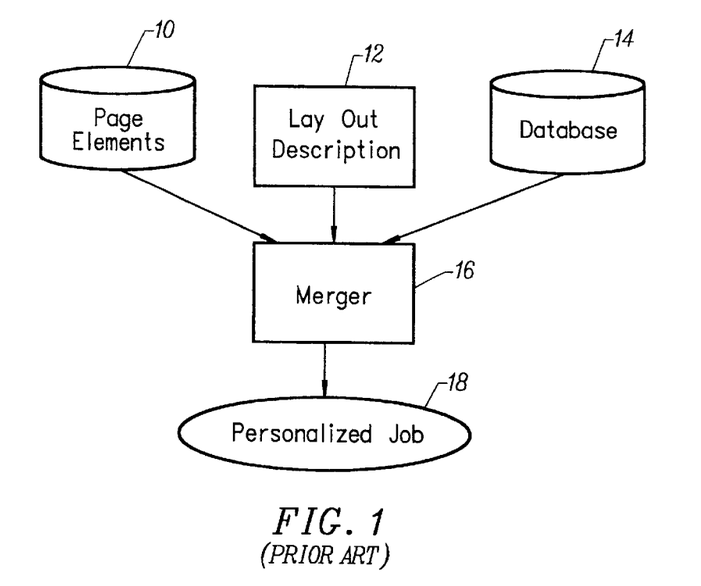
FIG. 1 is a block schematic diagram that shows a general description of the data flow of a personalization front-end system.

FIG. 1 is a block schematic diagram that shows a general description of the data flow of a personalization front end system. The front end of a personalization system is composed of all of the applications necessary to build a personalized job that is delivered to the RIP. FIG. 1 depicts a simple data flow of the front end applications. It does not show the work flow which is described in more detail later. Such applications come in many shapes and sizes. Most personalization applications contain the above components in one form or another, but do not necessarily use them in the same ways. The majority of the front end applications are built by third party developers specializing in layout design, building graphics, and database design and access.

The following is a general description of the components of a front end system.

Database 14: Contains all of the information that are queried to generate the data set. It may contain demographics for target customers who receive customized bills or sales information. It could also contain information about a region of the country to drive specific versions of a sale catalog. For example, prices may differ by region, or depending on the current weather in the area, specific kinds of clothes could be chosen.

Page Elements 10: Page definition language describes a picture (e.g. graphics, or text) to be applied on a page.

A page element is defined in terms of (PDL) (e.g. PostScript, or HP PCL) or any other graphic format (e.g. TIFF or HTML).

Layout Description 12: A description of the layout (e.g. location, bounding box, orientation) of the elements on a page. A job might have layouts for several different pages. Each copy of the document could be made up of a different number of pages using, and possibly reusing, some or all of the layouts. The following convention is used to describe a page layout:

$$\text{Page} = (\text{Application 1, Application 2, ... Application});$$

where an Application applies a page element at a page location x,y for purposes of rendering the page element.

Merger 16: Builds the personalization specification file of the job. It uses the layout descriptions, page elements, and database queries to build a description of the final print job. The output of the Merger is a personalized job 18.

In the above example, the components of the process for building a personalized job are separate. Ideally, there are different people with different areas of expertise building each of the components of the job.

The page elements library is built by different artists, or potentially by scanning in different elements. There may be many sources of input for each page element.

The layout description is built by a graphic artist or report designer who creates the layout of the document. This person needs some minimal information about the page elements (such as size and rotation) but does not need to have direct access to the data to build the design. The artist also wants to take into account what database fields contain information to be used in the layout. Again, the specific data are not needed, just information about it. Tools are built to make this design process as easy as possible by providing a clean user interface for describing the representation of the page elements, including location, rotation, scale, and bounding box.

The database is most likely built by an information systems professional. The data can be directly generated from different sources of input such as credit card purchase information and past orders from mail catalogs.

Figure 2:
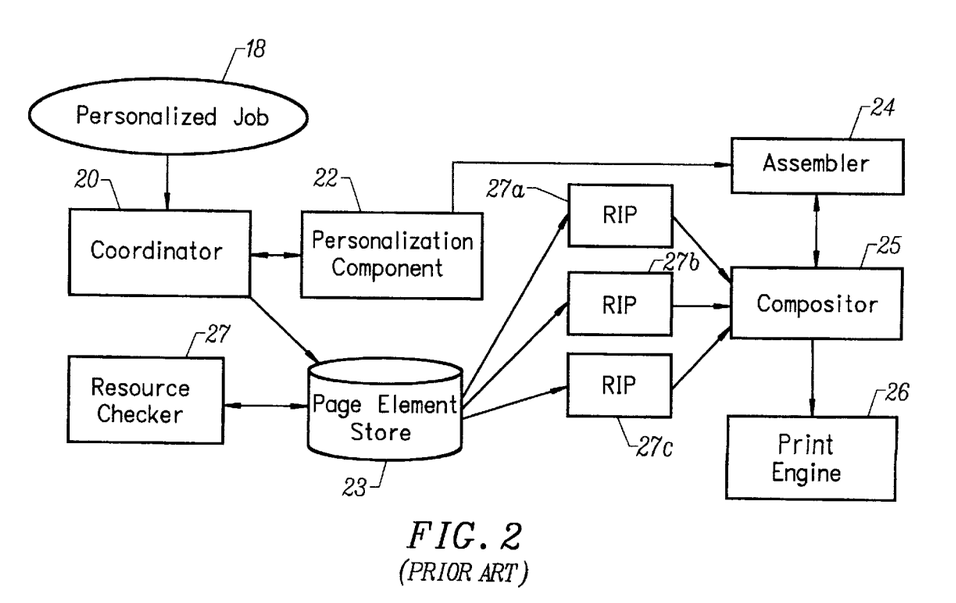
FIG. 2 is a block schematic diagram that illustrates how the personalization components fit into a prior art RIPing system.

FIG. 2 is a block schematic diagram that illustrates how the personalization components fit into a prior art RIPing system. In the prior art (such as the Supra product manufactured by Adobe Systems Inc.(see Personalized Printing, Adobe Systems Inc. (October 1996)); see, also D. Punater, R. Gaspar, V. Kubert, M. Duchesne, Printing Press and Method, U.S. Pat. No. 5,043,749 (Aug. 27, 1991) and D. Punater, R. Gaspar, V. Kubert, M. Duchesne, Printing Press and Method, U.S. Pat. No. 5,136,316 (Aug. 4, 1992), the focus is on RIPing jobs on a page parallel basis for fast throughput. The RIPed pages are then combined at the print engine. The prior art provides the ability to cache and reuse RIPed page elements. Multiple RIPs are used to process page elements in parallel. When this is combined with the reusability of those page elements, the result is improved performance for printing personalized jobs.

The merging is an automatic process generally done on a server. There should be no manual intervention necessary. All of the rules regulating database queries and what to do with nonstandard data should be defined before the merging takes place. The merger is tasked with building a personalized job. It queries the database to determine which information to place in each copy of the personalized document. It also specifies how many pages go in each copy, which template to use for each page, and which page elements to use in each of the fields in the layout description.

The output of the merging process is a personalized job. This job contains a description of the unique data for every copy of the document, as well as the page elements and layout descriptions. It also describes how to access each component.

The RIPing component of a prior art personalization system lies in between the front end system and the print engine. It receives as input from the front end. The RIP is also tightly integrated with the print engine which outputs the resulting personalized print run.

Personalized jobs 18 are delivered to the coordinator 20 inside Adobe's Supra product. The personalization module 22 is notified, and it then begins processing the file. The primary purpose of the personalization module is the management of page elements which are contained in the page element store 23. The personalization module controls their flow in and out of the system, their rasterization by the various RIPs 27a–27c, and their caching. As the variable data information comes in from the job source, the personalization module determines which page elements are required, whether they have already been rasterized, and which layout descriptions are required for the page. It also processes this information into a simplified form, which it then passes to the compositor 25 (described below). The compositor, in conjunction with an assembler 24, then uses this information to compose the rasterized page elements into the finished page which is delivered to the print engine 26 for printing.

The page store contains the variable information, page elements, and layout descriptions. Because the page elements and layout descriptions are only referenced in the variable data stream, they must be accessed and cached locally to optimize performance. The page element store, which in a non-personalization system contains only full-page raster data, contains rasterized page elements during a personalized job. The personalization module does not send elements to the RIPs twice.

The resource checker 21 communicates directly with the personalization module to verify that all the necessary page elements and templates are present. It does a preflight operation to ensure that the job prints successfully.

The compositor is responsible for combining the rasterized page elements into a final form for delivery to the print engine in real time. It knows the order in which to paint the page elements. Compositors have a full frame buffer of memory to use, several frame buffers, or maybe only enough memory for several bands. Some compositors composite multiple page elements at once, reading multiple channels simultaneously from the bitmap cache.

One disadvantage of such prior art techniques is the amount of memory and processing power required to store and merge the various elements of a job. Further, although there is some speed enhancement with such approaches, performance is still far short of that required for most commercial applications. It would be advantageous to provide a system in which jobs and applications require less compute power and less storage space, and in which RIPing and processing speed is increased.

SUMMARY OF THE INVENTION

The invention concerns variable data printing in which many pages are generated, where each page is defined as a sequence of applications of a label to a page. For purposes of the discussion herein, the terms "label" and "page element" will be used interchangeably. For purposes of the invention, each application may be described as <point of application, label description>. Thus, a variable data Job (varJob) is made out of variable data pages (varPages). VarPages are composed by merging pregenerated labels. Labels are color separated, encoded (e.g. Using document compression comprising SDSO and JPEG) rectangular patches. SDO is a run length based encoding scheme that overlays another compression scheme which may be grid aligned and applied arbitrarily to a page (such as JPEG). See, for example L. Pardo, Image Rendering for Page Printers, PCT Application No. WO 97/02542, and Y. Accad, Apparatus and Method for Hybrid Compression of Raster Data, U.S. patent application Ser. No. 08/773,656, filed Dec. 24, 1996.

Labels are applied on any position in the page. All necessary clipping is preferably performed before labels are submitted to the VarJob. Optionally, the invention may include hardware for performing such clipping.

Labels are preprocessed as soon as they become available. Presumably many labels are generated once and applied many times, albeit at different positions in the page. A label preprocessor processes labels after their submission to the job by cutting them into swaths and creating auxiliary information for further planning and scheduling purposes. A page planner analyzes the page composition, estimates times and bandwidth requirements, and prepares a page composition descriptor (PCDesc) that specifies the way that the page is composed. A page composer takes in a PCDesc and the necessary preprocessed labels and composes the page. The resulting page is again color separated and encoded.

DETAILED DESCRIPTION OF THE INVENTION

The invention concerns variable data printing in which many pages are generated, where each page is defined as a sequence of applications of a label to a page. For purposes of the discussion herein, the terms "label" and "page element" will be used interchangeably. For purposes of the invention, each application may be described as <point of application, label description>. Thus, a variable data Job (varJob) is made out of variable data pages (varPages). VarPages are composed by merging pregenerated labels. Labels are color separated, encoded (e.g. Using document compression comprising SDSO and JPEG) rectangular patches. SDO is a run length based encoding scheme that overlays another compression scheme which may be grid aligned and applied arbitrarily to a page (such as JPEG). See, for example L. Pardo, Image Rendering for Page Printers, PCT Application No. WO 97/02542, and Y. Accad, Apparatus and Method for Hybrid Compression of Raster Data, U.S. patent application Ser. No. 08/773,656, filed Dec. 24, 1996.

Labels are applied on any position in the page. All necessary clipping is preferably performed before labels are submitted to the VarJob. Optionally, the invention may include hardware for performing such clipping.

Application of the invention follows the standard opaque set raster operation provided in the PostScript language (manufactured by Adobe Systems, Inc. of San Jose, Calif.)., with a simple generalization that there is a special transparent color that allows for the color below it to be seen. Although the preferred embodiment of the invention is described in connection with the PostScript language, the invention is readily applied to other imaging methods.

Labels are preprocessed as soon as they become available. Presumably many labels are generated once and applied many times, albeit at different positions in the page. A label preprocessor processes labels after their submission to the job by cutting them into swaths and creating auxiliary information for further planning and scheduling purposes. A page planner analyzes the page composition, estimates times and bandwidth requirements, and prepares a page composition descriptor (PCDesc) that specifies the way the page is composed.

A page composer takes in a PCDesc and the necessary preprocessed labels and composes the page. The resulting page is again color separated and encoded.

Hardware Composer

The Hardware Composer (HWC) implements the label composition algorithm described above. The HWC is connected to a system (Main System) via a bus, e.g. a PCI bus.

Inputs and Output

The HWC receives, via the system PCI bus:

A series of compose commands, defining the page to be created as a sequence of label applications;

The preprocessed labels to be applied; and

Pregenerated information about the resulting page, i.e. a pixel type map and a JPEG map.

The HWC, either through the system PCI bus or through an alternative ShipPCI bus, outputs the resulting page encoded and color separated, where such encoding may be accomplished any known encoding scheme.

The HWC processes information at the rate of its components. An HWC based system may parallel process pages by dividing them into as many segments as the number of HWC units it contains, assigning those parts to a unit and submitting the partial composition task simultaneously to all units.

Label Preprocessing

Label preprocessing (FIG. 3) transforms an encoded CMYK label into a color separated representation. This representation is such that an expander may be started at the beginning of any of a set of special scanlines which impose a swath structure onto the label. Label preprocessing also creates a Pixel Type Map of the label. This map defines each pixel's characteristics (discussed in greater detail below).

Figure 3:
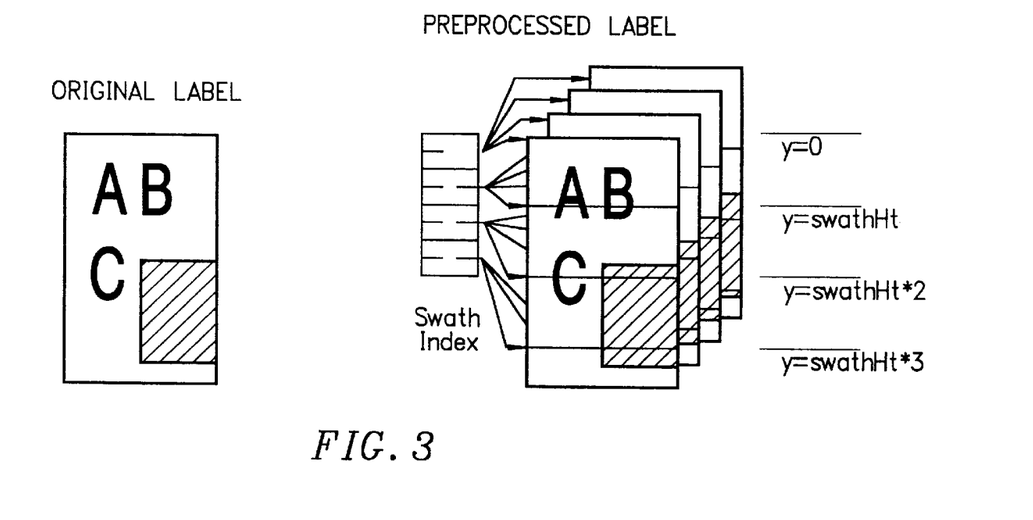
FIG. 3 is a block diagram showing label preprocessing according to the invention.

A system wide parameter:

$$swathHt = k*jpegStripHt$$

defines the swath height. The swath grid is congruent to the JPEG grid. A special table, the Swath Index, points to the beginning of each swath within the label. Each entry points to:

The beginning SDSO scanline for the swath (this scanline is "absolute" in the sense that it contains no references to the previouscanline). There is one pointer for each color separation;

The beginning JPEG strip for the swath. Again, there is one pointer for each color separation; and The corresponding beginning line in the Pixel Type map.

Label Application

The application of a label (FIG. 4) defines:

An application point in the page: app.coord=<x, y>; and

Figure 4:
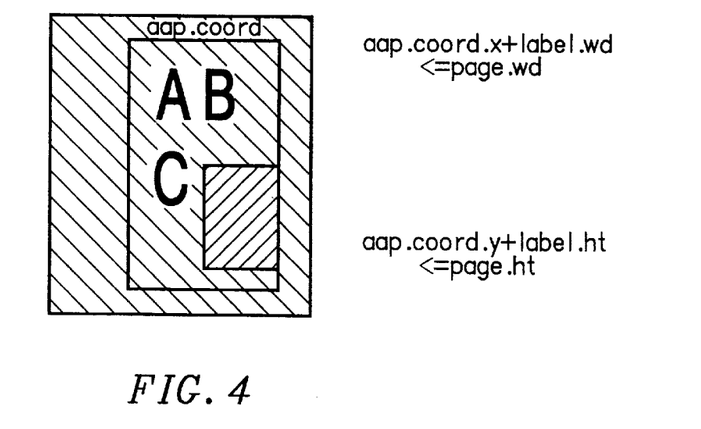
FIG. 4 is a block diagram showing label application according to the invention.

An application time app.time. This time is the order of application, so that if appA is applied before appB, then appA.time <appB.time.

Composing by Banding

A page is composed by dividing it into bands of height:

$$band.ht = m*swath.ht$$

Label application is realized by applying labels to each band in appTime order. Labels are applied to bands by applying only the subsequent swaths that actually overlap with the band, when are located by using the label's Swath Index.

Composing:

One preferred method for composing is based on the following tenets:

It simplifies compression by using selecting ACS or JPEG compressors based on the decision made in the source labels;

It should allow multiple composers with little overhead;

It should be possible to isolate any full raster access to the inside of the composers. Traffic to and from the composers is only compressed streams.

The composition has two parts:

First, compute the Pixel Map for the resulting page, based on the Page Composition Commands and the precomputed label maps;

Then, process the page, band by band, composing and compacting each band.

Precompute Page Pixel Map.

This step may be performed on the whole page, or on a band per band basis. It may also be performed as part of the page preprocess (using the main CPU) or as part of the composition process (using the composer CPU).

Compose the Page, band per band.

The Composer works on successive bands, and for each band it performs the following steps:

Apply labels: in appTime order. This application generates a Pixel Array for the band;

Compress resulting band: using the resulting Pixel Array and the precomputed Pixel Map.

Applying labels to a band.

The following pseudo code listing describes the actual composition for a band:

for all (labels that overlap the band) {

Using label's Swath Index select first swath that overlaps the band;

Start ECT Expansion at the selected swath (this generates pixels left to right, top to bottom) for all (generated pixel's) {
  if (pixel is above band) {
    /* Skip part of first swath above band */
    continue;
  } else if (pixel is below band) {
    /* Done with band */
    break;
  } else if (pixel.tag != SDSOTransparent) {
    /* Inside band: apply */
    bandPixel.color =pixel.color;
    bandPixel.tag =pixel.tag;
  }
}
Stop ECT Expansion (for all pixels below band);
}

Compressing the Pixel array for a band.

All pixels in the band are sent to the appropriate compressor (ACS or JPEG). Tags for band pixels are extracted from the Page Pixel Map.

for all (pixel's in band) {
  switch (pixel.tag) {
    JPEGOpaque:
      Send pixel.color to JPEG compressor;
      Send ECTColor to SDSO compressor;
      break;
    SDSOOpaque:
      Send pixel.color of SDSO compressor;
      Send blank color to JPEG compressor;
      break;
    SDSOTransp:
      Send background.color to SDSO compressor;
      Send blank color to JPEG compressor;
      break;
}

Parallel Composing

Composers may be used in parallel, one composer per band. After the bands are composed, a stitching process ties all the bands together into the resulting page.

Top Level Modules

Figure 5:
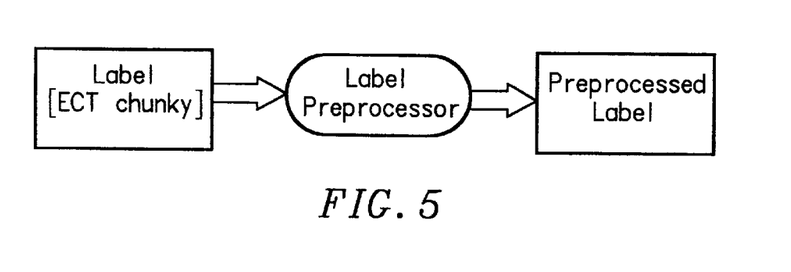
FIG. 5 is a block diagram showing a label preprocessor according to the invention.

Label Preprocessor (FIG. 5)

Module: Parallel Color Separation, with swath generation.

Module: Swath Index Generation

Module: JPEG/Transparency Map Generation

Module: ECT Parsing, Color Separation and Generation services

Figure 6:
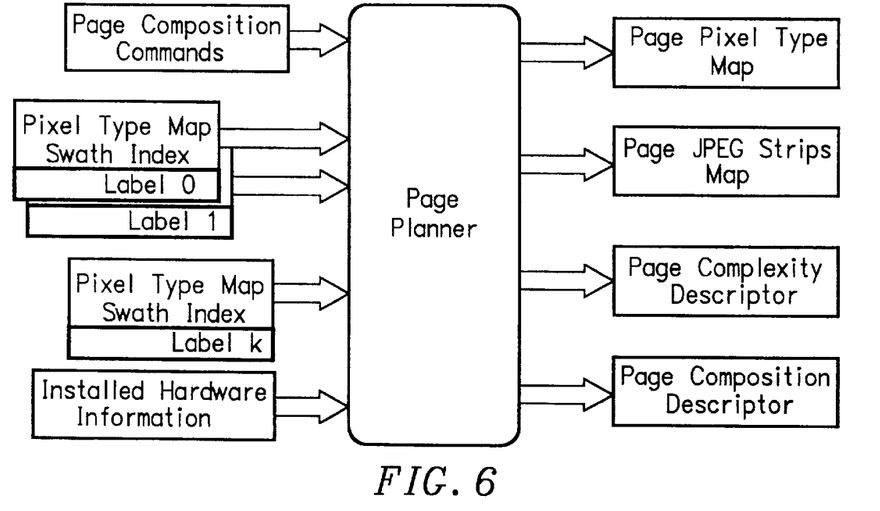
FIG. 6 is a block diagram showing a page planner according to the invention.

Page Planner (FIG. 6)

Module: Resulting Page Map computation

Module: Resulting JPEG Vector Generation.

Module: Estimate Page Complexity, Bandwidth requirements needed to compose the resulting page and design a way to describe them (Page Complexity Descriptor).

Module: Generate Page Composition Descriptor.

Figure 7:
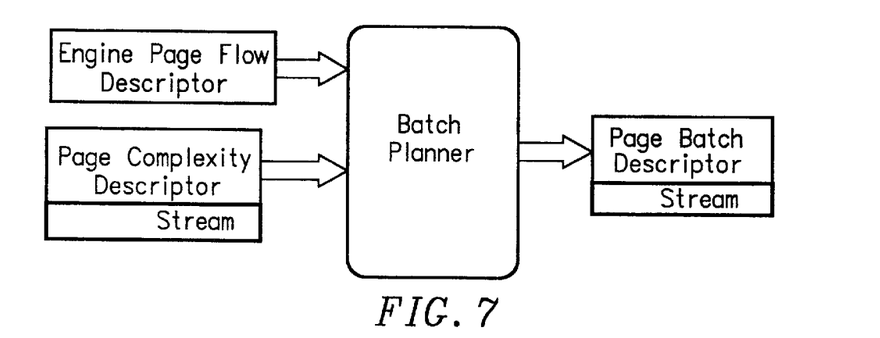
FIG. 7 is a clock diagram showing a batch planner according to the invention.

Batch Planner (FIG. 7)

This subsystem maximizes the engine paper movement. The Engine Page FlowDescriptor summarizes the engine characteristics (e.g. start and stop delays, warm and rev up times)

Module: Batcher: gets Page Complexity Descriptors and decides on page batches given engine characteristics.

Figure 8:
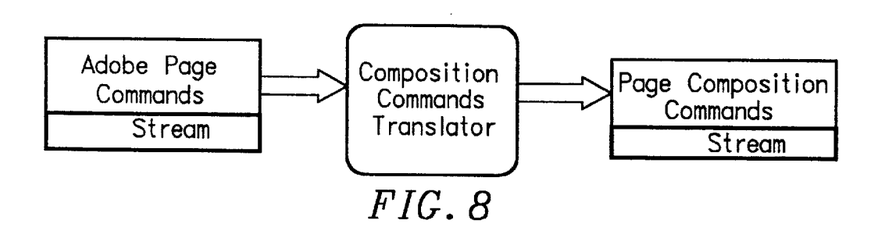
FIG. 8 is a block diagram showing an adobe interface according to the invention.

Adobe Interface (FIG. 8)

Module: "Adobe Page Commands" to Page Composition Commands

Figure 9:
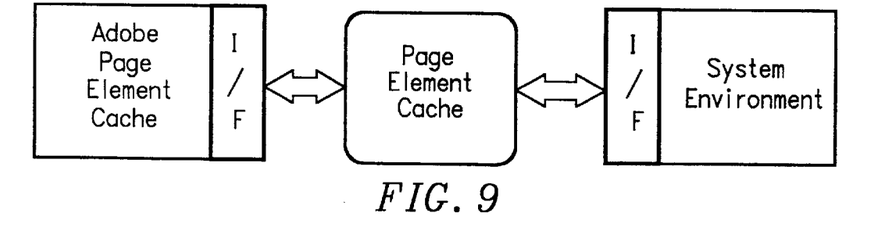
FIG. 9 is a block diagram showing a page element cache according to the invention.

Module: Page Element Cache (top level interface) (FIG. 9)

Rotation Option

Assume a Page Composer with Rotate 180 Capabilities.

Extend Page Elt. Cache

Extend Page Planner.

Multiple Storage Hierarchy Option

Extend Cache, including local memory and disk storage.

Module: Object location and swapping layers.

Module: Storage management policy. (Use standard operating systems paging strategies)

Module: Bandwidth management.

Structure

Figure 10:
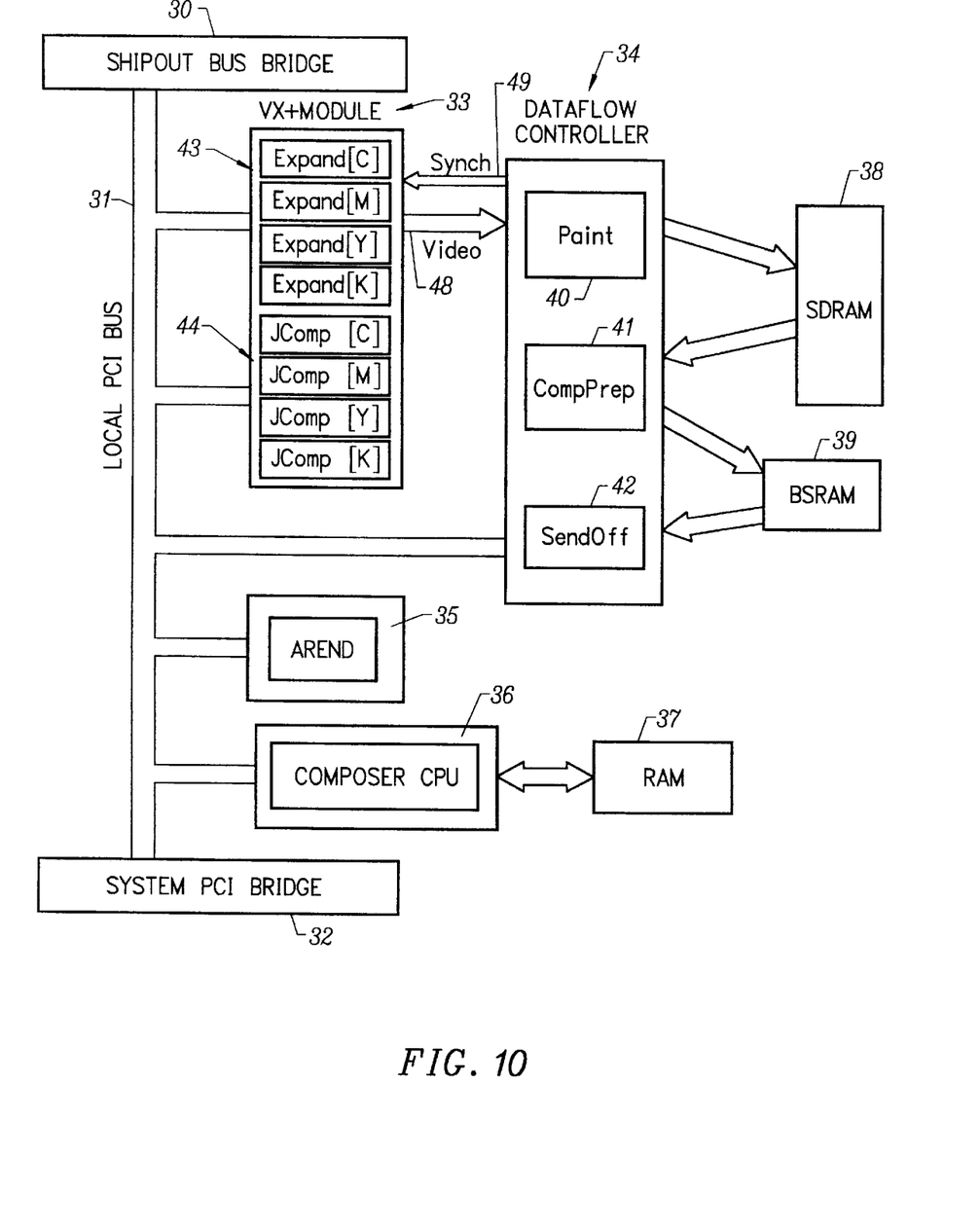
FIG. 10 is a block schematic diagram showing the structure of a hardware composer according to the invention.

FIG. 10 is a block schematic diagram showing the structure of an HWC according to the invention. The preferred embodiment of the invention isolates the composer into an autonomous unit, with its own internal local PCI bus 31, communicating with the rest of the system via two PCI bridges 30, 32.

The local PCI bus 31 handles all internal traffic between modules, including all the component setup via CSR setting. For purposes of the discussion herein, PCI refers to a bus and protocol therefor, and CSR refers to control and status registers. Writing to and reading from the CSR registers establishes control and communications between hardware elements in the bus. The system PCI bridge 32 handles all of HWC inputs that are received through this bus. In many systems, the system PCI bridge also carries the resulting pages. Communication and synchronization with the main system (not shown) (by means of a messaging protocol) also takes place through the system PCI bridge. The main CPU and composer communicate via a stream of commands created by the main CPU. The commands carry information about how to apply labels.

The shipOut PCI bridge 30 connects to the shipOut bus, which is dedicated to the transport of resulting pages to the printer queue. The shipOut bus is used in very high page rate systems and systems that require a fairly unloaded system PCI bus. Other embodiments of the invention may use the system PCI bridge for transport of print jobs to the printer queue.

An expander subsystem 43 has two input streams, i.e. an SDSO stream and a JPEG stream. For output, the video signal is synchronized by a signal provided by a synch bus. The video bus 48 provides a CMYK color stream, which is the aggregation of four single plane color outputs (32 bits).

The expander module 43 is controlled by the composer CPU 36, which sets input streams for each expander and which stops the expanders after each label application.

A JPEG compressor subsystem 44 receives an input which consists of sets of 8 by 8 pixel blocks that are generated by the data flow controller (DFC) 34. The compressor output consists of JPEG encoded blocks, including space for JPEG block vectors.

The compressor subsystem 44 is controlled by the composer CPU 36, which sets input streams for each JPEG strip and which records the output address for each strip to fill in JPEG block vectors later.

The (DFC) 34 controls a large portion of the information exchange between modules in the HWC. The data flow controller 34 is at the core of the composer hardware, staging the actual data traffic between components. The DFC is comprised of three main subsystems: Paint 40, CompPrep 41, and SendOff 42. These subsystems operate in parallel as follows:

Paint and the pair (CompPrep, SendOff) operate by pipelining successive bands using the SDram 38 as pipe storage; and CompPrep and SendOff pipeline strips within a band using the BSram 39 as pipe storage.

The paint subsystem 40 paints in all the labels that need to be applied onto a band. Labels are received from the expander subsystem 43 as a CMYK video stream. The CompPrep subsystem 41 prepares a band that has previously been painted by the paint subsystem for compression. For each band, the CompPrep subsystem separates the pixels to be compressed by SDSO and those to be compressed by JPEG, basing its decision on a pixel type map precomputed by the main system.

For each strip within a band, the CompPrep subsystem 41 prepares and stores five streams in BSRAM 39:

JPEG expanded strips, one for each color plane, containing the blocks to be JPEG compressed; and The SDSO non-differential representation of the rest of the strip, i.e. a CMYK SDSO stream containing no DIFF* commands.

The SendOff subsystem 42 directs the output of each one of the five streams already prepared by the CompPrep module. The SendOff subsystem operates on strips that have been previously prepared.

The composer CPU 36 implements the top level of the HWC. It controls all of the different modules in the HWC, communicates with the main system via a messaging interface, and serves as an intermediate data storage for streams that are sent to other modules in the HWC.

The composer CPU also executes various software functions for the composition process, which include finishing the JPEG output streams by inserting the JPEG block vectors and partitioning the compose commands into band based commands.

Figure 11:
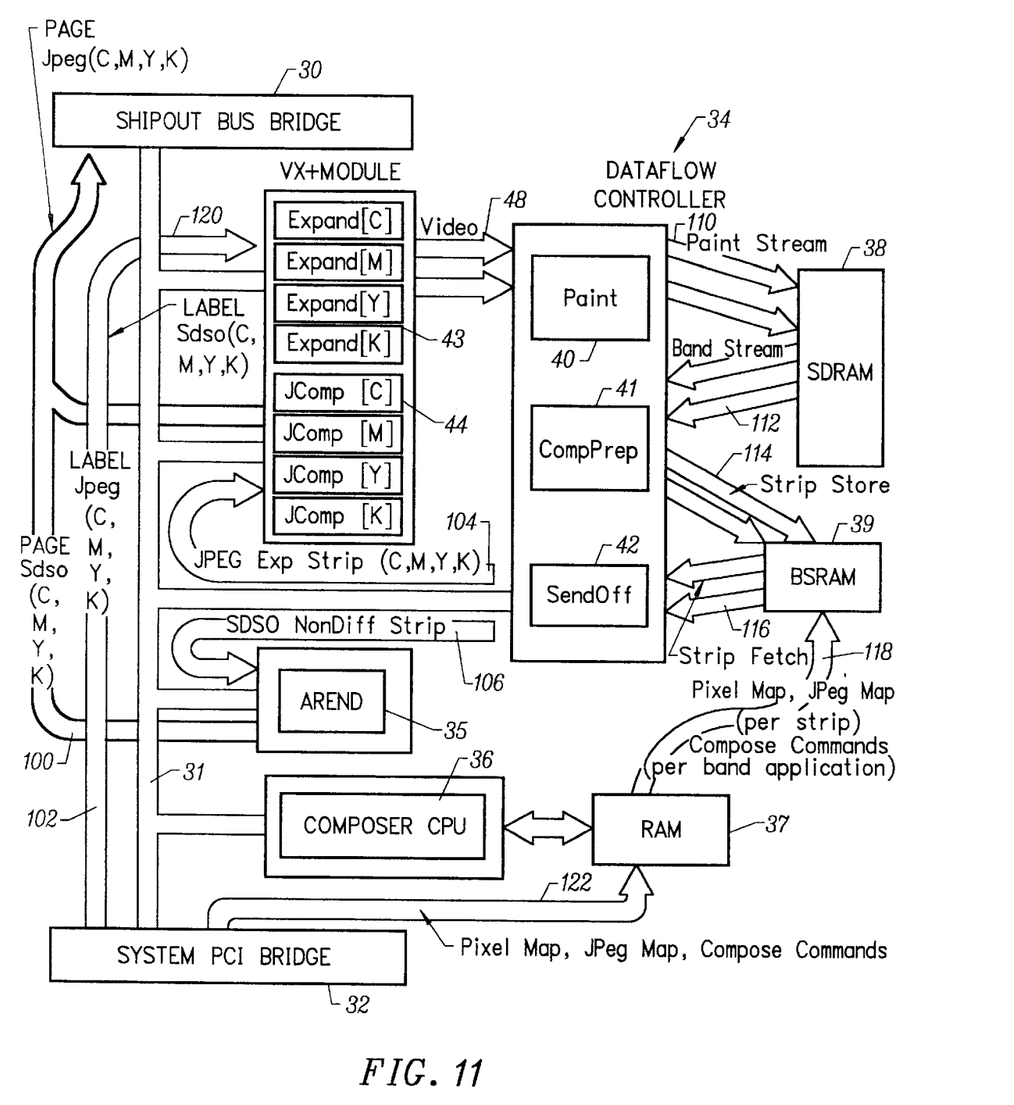
FIG. 11 is a block schematic diagram showing information flow and structure according to the invention.

FIG. 11 is a block schematic diagram showing information flow and structure according to the invention. Information flows mostly in the form of streams.

Input streams carry the label representation to be applied on each band. The input streams comprise a preprocessed, color separated encoded stream 120 consisting of an SDSO stream and a JPEG stream. Thus, there are a total of eight streams, i.e. SDSO for C, M, Y, and K planes and JPEG for C, M, Y, and K planes. For each band, labels are applied in composition order. Label sources are stored in system memory and are accessed via the system PCI bridge 32.

The video stream 48 carries the expanded label. The video stream is a CMYK pixel stream in which pixels are organized as a pixel array in row major order. The pixel array overlaps the band, possibly starting at an earlier scan line.

When the stream starts above the band, the DFC paint subsystem 40 clips the pixels as needed. Routing of the video stream is generated by the expander modules 43. Flow of the video streams is controlled by the paint subsystem 40.

The paint stream 110 comprises actual label pixels to be applied on a band, where all extra pixels have been discarded by the DFC paint subsystem 40. The paint stream is a sequence of color applications (e.g. color value, address) to be written into the current band in the SDram module 38. The DFC SDram output module (55; FIG. 5) controls writing of the paint stream to the SDram module from the paint subsystem. Transparent color is not painted. Rather, a skip in the SDram address is generated.

The band stream 112 is generated once per band and contains the final expanded pixel array for the band. The band stream comprises a pixel array arranged in row major order. The DFC SDram input module (53; FIG. 5) controls reading of the band stream from the SDram module to the CompPrep subsystem.

For each JPEG stream (in each color plane), the expanded strips stream 104 contains the expanded (8 by 8) blocks to be compressed by the Comp modules 44. Only the non-empty blocks are generated. The CompPrep subsystem 41 generates the expanded strips stream on a strip by strip basis. The stream is stored in the BSRAM.

The pixel type map (118, 122) defines the pixel characteristics of the resulting page. The map is encoded differentially. Map lines are 32 bit word aligned and made up commands that are nibble encoded. Encoding is intended to make hardware simple, rather than achieving the ultimate compression rate.

The pixel type map is created by the main system in advance of the actual page composition. The composer CPU 36 receives the pixel type map before a band needs to be processed by the CompPrep subsystem 41, and then stores the pixel type map in a corresponding BSram module 39 region in advance of DFC 34 access to it.

The JPEG map (118, 122) defines which JPEG blocks are non-empty in the resulting page. The JPEG map is created by the main system in advance of the actual page composition. The composer CPU 36 receives the JPEG map before a band needs to be processed by the CompPrep module 41 and stores it in the corresponding BSram module 39 region.

The strip store and fetch streams 114, 116 are storage operations for the JPEG and SDSO strips produced by the CompPrep subsystem and consumed by the SendOff subsystem 42. Their organization is only relevant as part as the general handling and allocation of the BSram module and is discussed below in connection with the DFC BSram description.

The compose commands stream (118, 122) defines the application order, position (and other parameters) of labels onto the page.

Compose commands defining the whole page composition are created by the main system. The composer CPU 36 receives the compose commands at the beginning of a page and partitions them into band congruent commands. These new band commands are then stored in band dispatch order in the command region of the BSram module for use by the paint subsystem.

Paint Subsystem

Figure 12:
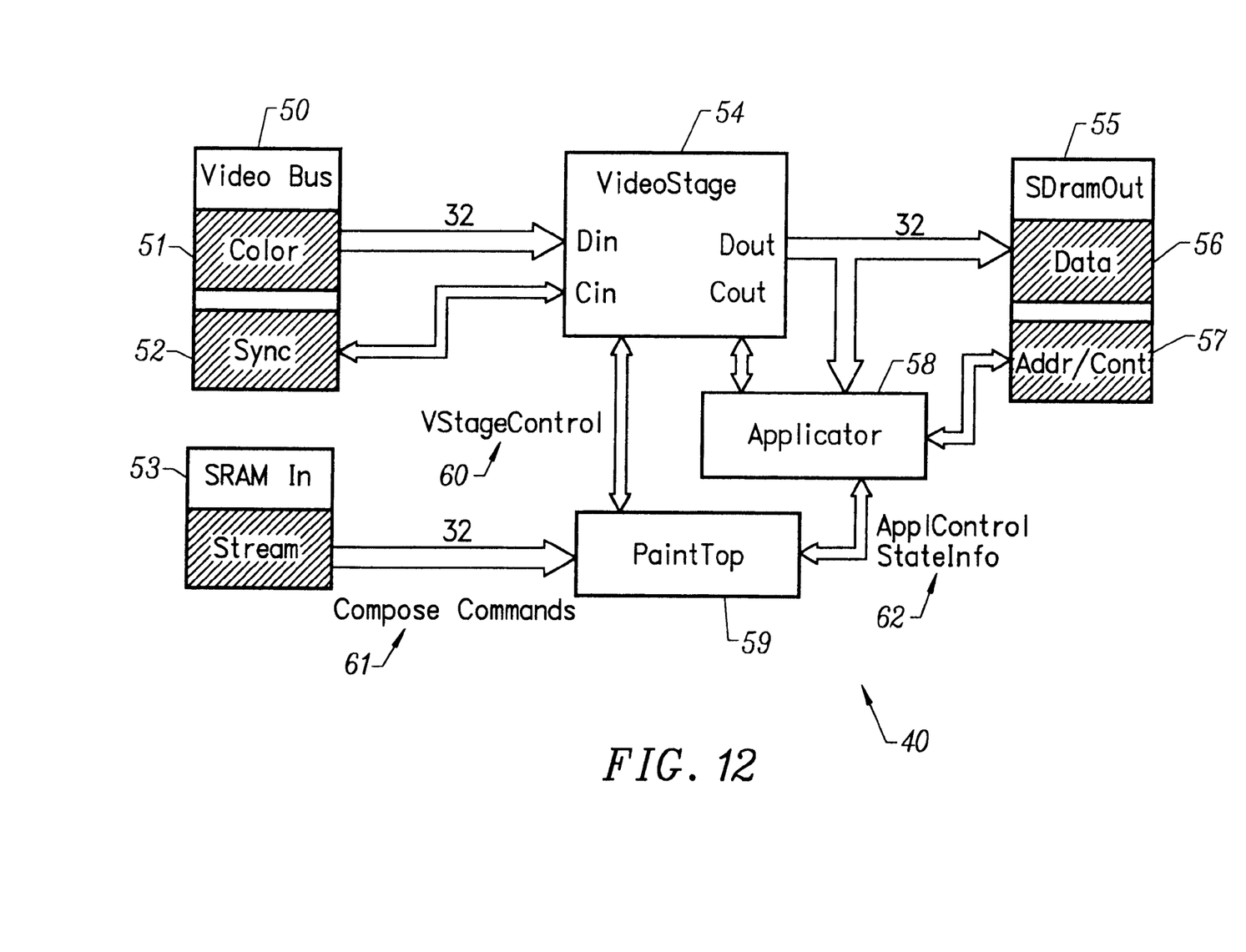
FIG. 12 is a block schematic diagram of a paint subsystem according to the invention.

FIG. 12 is a block schematic diagram of a paint subsystem according to the invention. The paint subsystem implements the label application process to the current band. It effectively transforms the video stream 48 (FIG. 11) into the paint stream (110).

The PaintTop module 59 controls the rest of the paint subsystem. Its main functions include command processing, which receives and interprets compose commands; state information setting, which sets information according to commands; and controlling the collector and applicator modules 58.

The video stream from the expander subsystem is staged into the SDram output 55 via the video stage 54. The video stage module provides any necessary FIFO buffering. The size of this buffering depends on how the SDram module is organized. If the SDram module is organized as two separate 32 bit wide banks, then only a staging register is required. On the other hand, a double width (64 bit) single bank SDram module requires a large FIFO to allow for sharing with the CompPrep module.

The applicator module 58 steps the SDram module writing of the applied colors. The input colors are checked for transparency. When a pixel's color equals Transparent Color, then the pixel is not applied (ie. its corresponding address is skipped). This assumes that the SDram out module 55 is able to skip writes when a transparent pixel is applied. The condition pixelsInBounds is kept by means of two control registers, i.e. leftSkipCnt and writeCnt, as shown by the pseudo code listing below:

```
always @ (posedge clock) begin
    if (lineSync) begin
        // Initialize at horizontal sync
        leftSkipCnt <= leftMargin;
        writeCnt <= lineWidth;
        pixellsInBounds <=leftMargin == 0 && lineWidth
            !=0;
    end else if (VideoStageAdv) begin
        if (leftSkipCnt >0) begin
            // Advance left margin
            leftSkipCnt <= leftSkipCnt - 1;
            pixellsInBounds <= false;
        end else if (writeCnt > 0) begin
            // Advance inside of line
            writeCnt <= writeCnt - 1;
            pixellsInBounds <= true;
        ens else
            pixellsInBounds <= false;
    end
end
```

The basic flow control is based on the availability of data at the output of the video stage module, and the SDram module being ready to take in an application, as shown by the pseudo-code listing below:

```
if (VideoStageRdy) begin
    if (colorIsTransparent) begin
        IncreaseSkipCount;
        VideoStageAdv = true
        if (! pixelsinBounds) begin
            VideoStageAdv = true;
            ResetSkipCount;
        end else if (SDramOutAdv) begin
            SendColorAndSkipToSDram;
            ResetSkipCount;
        end else
            VideoStageAdv = false;
    end
```

Figure 13:
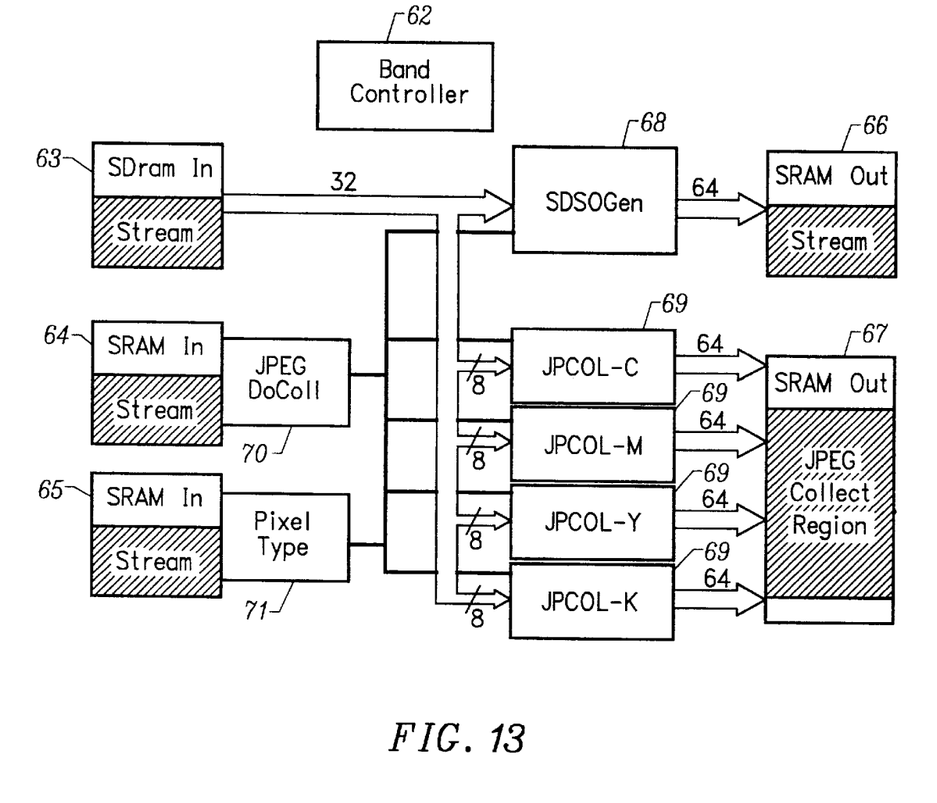
FIG. 13 is a block schematic diagram of a ComPrep subsystem according to the invention.

FIG. 13 is a block schematic diagram of a ComPrep subsystem according to the invention. With regard to data distribution, the band is read from the corresponding SDram bank 63. Pixels come in as a stream. At the end of every scan line, the last few pixels may be skipped if needed (i.e. when the scan line is allocated a larger buffer than its width). The pixel stream is used in full by the SDSOGen module 68. Each one of the pixel planes is routed as input into the corresponding JPCOL module 69.

The band controller module 62 keeps track of where in the band various activities are happening. The band controller module generates the necessary end of line signals.

The SDSOGen module 68 generates SDSO based on the current pixel type (provided by the PixelType module 71) and the current pixel color (from the SDram input stream). The SDSOGen module first considers the current pixel. If the current pixel is SDSOTransparent, then the pixel's color is set to BackgroundColor.

SDSO runs start by issuing a CSET command. The run lengths keep increasing while the color remains the same. When color changes, or a JPEG pixel appears, the length is issued by means of an RL command. Similarly for JPEG runs, the runs start by issuing a YSET command. After that, the length keeps increasing until the pixel type changes. The end of line condition generated by the band controller 62 forces the generation of an EOL command.

The JPEG block collector (JPCOL) modules 69 are one-row stages for the collected 8-bit colors. Collection occurs any time JPEGDoColl is active. The band controller 62 generates the endOfJPEGBlock signal necessary to pass on the collected rows to the SRAM Out module 66.

The PixelType module 71 decodes the current pixel type run and advances synchronously with the rest of the subsystem. When the current run is exhausted, the next run is brought in from the BSram pixel map region through the corresponding FIFO.

The JPEGDoColl module 70 decodes the current JPEG Vector and advances synchronously with the rest of the CompPrep subsystem. When the current run is exhausted, the next run is brought in from the BSram pixel map region through the corresponding FIFO.

Figure 14:
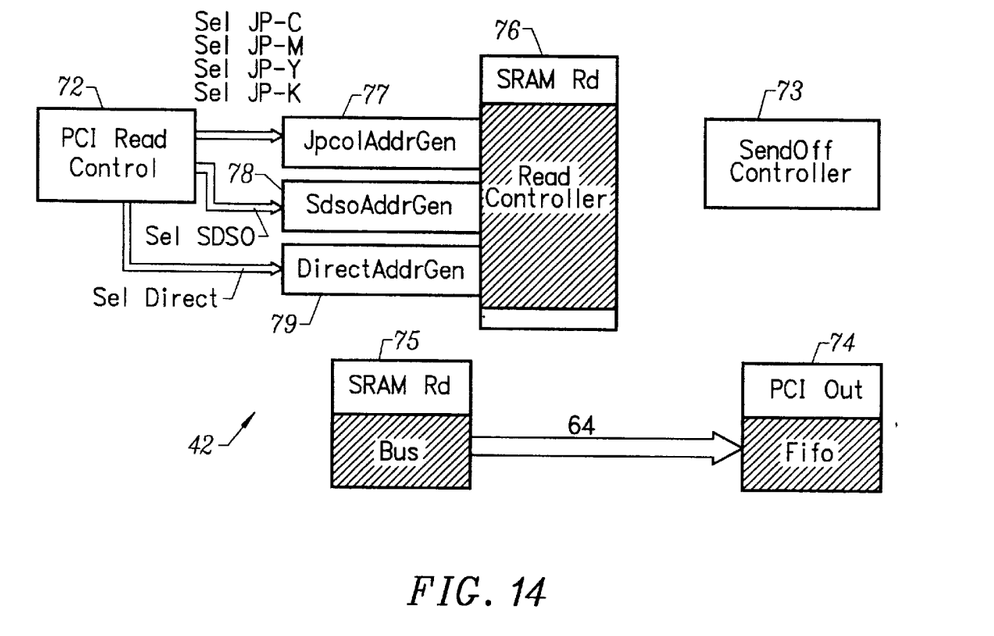
FIG. 14 is a block schematic diagram of a SendOff subsystem according to the invention.

FIG. 14 is a block schematic diagram of the SendOff subsystem 42 according to the invention. The SendOff subsystem 42 is essentially an intelligent processor for the PCI read requests. It interprets the addresses and fetches the right information from the BSram module.

The SendOff controller module 73 synchronizes band advances and maintains the producer/consumer synchronization with the CompPrep module.

Address Generation for SendOff and direct read is accomplished as follows:

The PCI read address selects the region to read. This selection activates the corresponding address generator 77, 78, 79. The DFC module implements PCI slave mode only. All transfers to and from the DFC module are mastered by other components.

There are three read modes:

Read SDSO Region: This reads the next SDSO sequence available.

Read JPCOL Regions (C, M, Y, K): This reads the next color sequence available.

Direct: This is a direct mapping of the whole BSRam, and allows to access any of its contents.

Notice that in all cases the address mapped must be at least as large as the whole region to allow for DMA in the master component to increase their address and stay within the region. The read accesses are buffered to allow for a slower PCI clock.

The only write access mode available is direct. Access is unbuffered, directly into the BSram module. Clients may only access the BSram module to store very small amounts of information (e.g. maps and compose commands).

Figure 15:
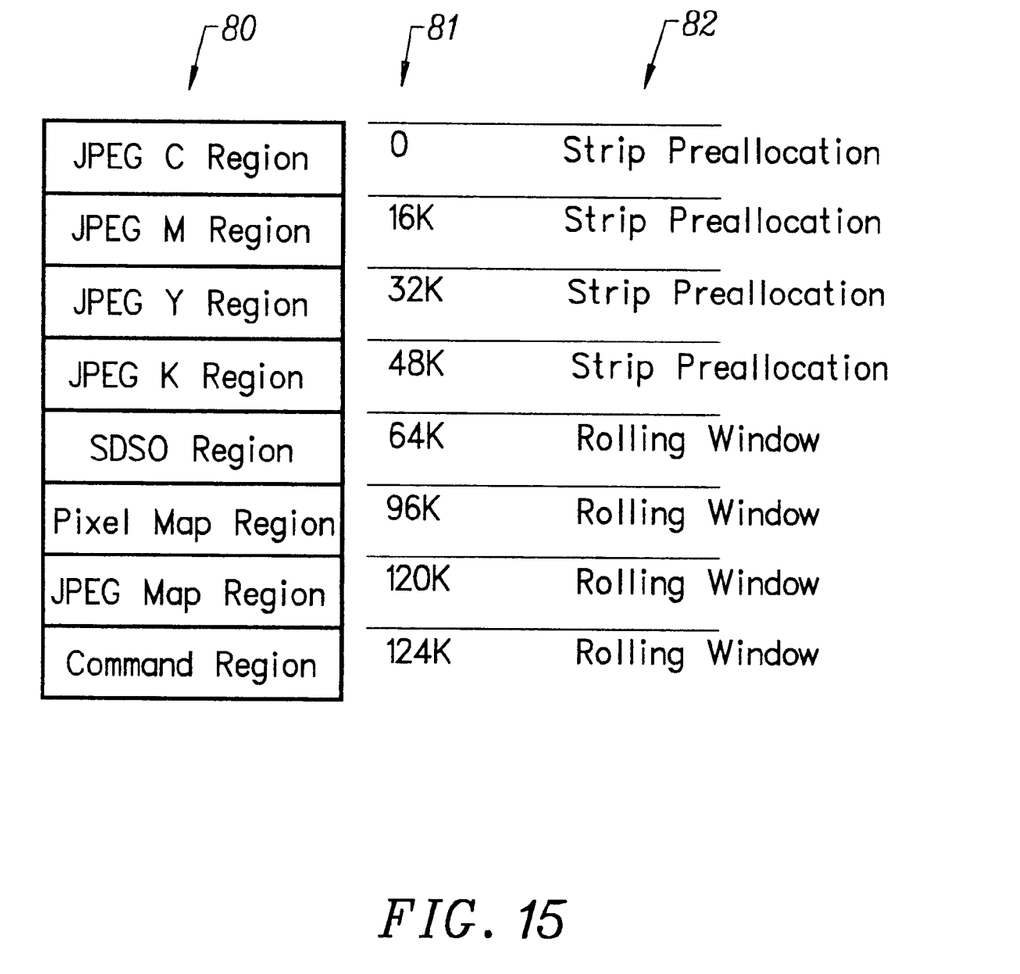
FIG. 15 is a block schematic representation of a partition scheme showing SRAM control according to the invention.

FIG. 15 is a block schematic representation of a partition scheme showing SRAM control according to the invention. A first column 80 identifies the various regions of the SRAM, a second column 81 identifies the actual memory allocation for such regions, and a third column 82 identifies the characteristic of the region.

The SDram module is divided into two banks, assigned in a ping-pong fashion to the Band-in-Paint and to the Band-in-Compress, respectively, which simplifies internal data paths and increases pin out. For 8K pixel scan lines, and 256 scan lines per band, each band requires 2M words, or two banks of 2M by 32 bits each.

For read access, a read stream is created to read the Band-in-Compress. For write access, the paint subsystem submits writes to the SDram module, in sequential (with skipping) order. Priority scheduling is not an issue if two banks are used. Otherwise, the read and write accesses should be buffered and scheduled round robin.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A method for variable data printing, comprising:
   analyzing page composition and estimating time and bandwidth requirements with a page planner;
   preparing a page composition descriptor (PCDesc) that specifies the way said page is composed;
   processing labels with a label processor, said processing comprising:
      cutting said labels into swaths; and
      creating auxiliary information for further planning and scheduling purposes; and
   providing a multitude of page composers, each of said composers taking in said PCDesc and a swath, said multitude of page composers processing independently in parallel said swaths and merging said swaths to compose variable data pages(VarPages).

2. The method of claim 1, further comprising:
   composing a variable data job (varJob) from said VarPages.

3. The method of claim 1, wherein said labels are color separated compressed rectangular swaths.

4. The method of claim 1, further comprising:
   clipping before labels are submitted to said VarJob.

5. The method of claim 2, further comprising:
   providing a page composer that takes in said PCDesc and said preprocessed labels and that composes said page.

6. A method of claim 1, wherein said labels are grid aligned and applied arbitrarily to said data pages.

7. An apparatus for variable data printing, comprising:

a multitude of hardware composers (HWC) operating in parallel, dividing variable data pages into bands, each band assigned to an HWC, wherein a partial composition task is submitted simultaneously to all HWC's for implementing a label composition scheme, said hardware composers comprising:
   means for composing said variable data pages (VarPages) by merging pregenerated labels divided into said bands; and
   means for composing a variable data job (varJob) from said varPages; and means for outputting a resulting page.

8. The apparatus of claim 7, wherein said HWC receives, via a system bus, a series of compose commands, defining a page to be created as a sequence of label applications; preprocessed labels to be applied; and pregenerated information about a resulting page.

9. The apparatus of claim 8, wherein said pregenerated information comprises a pixel type map.

10. The apparatus of claim 7, wherein said HWC is an autonomous unit, said HWC having its own internal local bus, said HWC communicating with an image processing system via at least one bridge.

11. The apparatus of claim 10, said at least one bridge comprising:
   a system bridge by which communication and synchronization is established with image processing system.

12. The apparatus of claim 10, said at least one bridge comprising:
   a shipOut PCI bridge which is dedicated to the transport of resulting pages to a printer queue.

13. The apparatus of claim 7, said HWC further comprising:
   a data flow controller for controlling at least a portion of the information exchange between modules in said HWC.

14. The apparatus of claim 13, further comprising:
   a first memory;
   a second memory
   said data flow controller further comprising:
      a paint subsystem for painting in all the labels that need to be applied onto a band and for storing said labels in said first memory as a paint stream;
      a CompPrep subsystem for preparing each strip within a band stream that has previously been painted by said paint subsystem and for storing a strip stream in said second memory; and
      a SendOff system for directing the output of each strip stream prepared by said CompPrep module, said SendOff subsystem operating on strips that have been previously prepared.

15. The apparatus of claim 14, wherein said paint subsystem operates by pipelining successive bands using said first memory as pipe storage; and wherein said CompPrep subsystem and said SendOff subsystem pipeline strips within a band using said second memory as pipe storage.

16. The apparatus of claim 14, wherein said paint stream comprises actual label pixels to be applied onto a band;
   wherein said paint stream is a sequence of color applications to be written into a current band in said first memory; and
   wherein transparent color is not painted.

17. The apparatus of claim 14, wherein said band stream is generated once per band and contains a final expanded pixel array for each band;

wherein said band stream comprises a pixel array arranged in row major order.

18. The apparatus of claim 14, said SendOff subsystem producing an output stream that contains a representation for a resulting band in which all transparent pixels are replaced by a background color.

19. The apparatus of claim 14, wherein a pixel type map is created by said image processing system in advance of actual page composition, said apparatus further comprising:

a composer CPU for receiving said pixel type map before a band needs to be processed by said CompPrep subsystem, and for storing said pixel type map in a corresponding region of said second memory in advance of data flow controller access to said pixel type map.

20. The apparatus of claim 19, said composer CPU providing a compose commands stream that defines application order, position, and other parameters of labels onto a page;

wherein said composer CPU receives compose commands at the beginning of a page and partitions them into band congruent commands; and wherein said new band commands are then stored in band dispatch order in a command region of said second memory for use by said paint subsystem.

21. The apparatus of claim 7, wherein said labels are grid aligned and applied arbitrarily to said data pages.

\* \* \* \* \*